Sept. 9, 1947.    L. H. BROWNE    2,427,253
EPICYCLIC DRIVE
Filed Sept. 21, 1943    2 Sheets-Sheet 1

INVENTOR
LINDSAY H. BROWNE
BY
ATTORNEYS

Sept. 9, 1947.  L. H. BROWNE  2,427,253
EPICYCLIC DRIVE
Filed Sept. 21, 1943  2 Sheets-Sheet 2
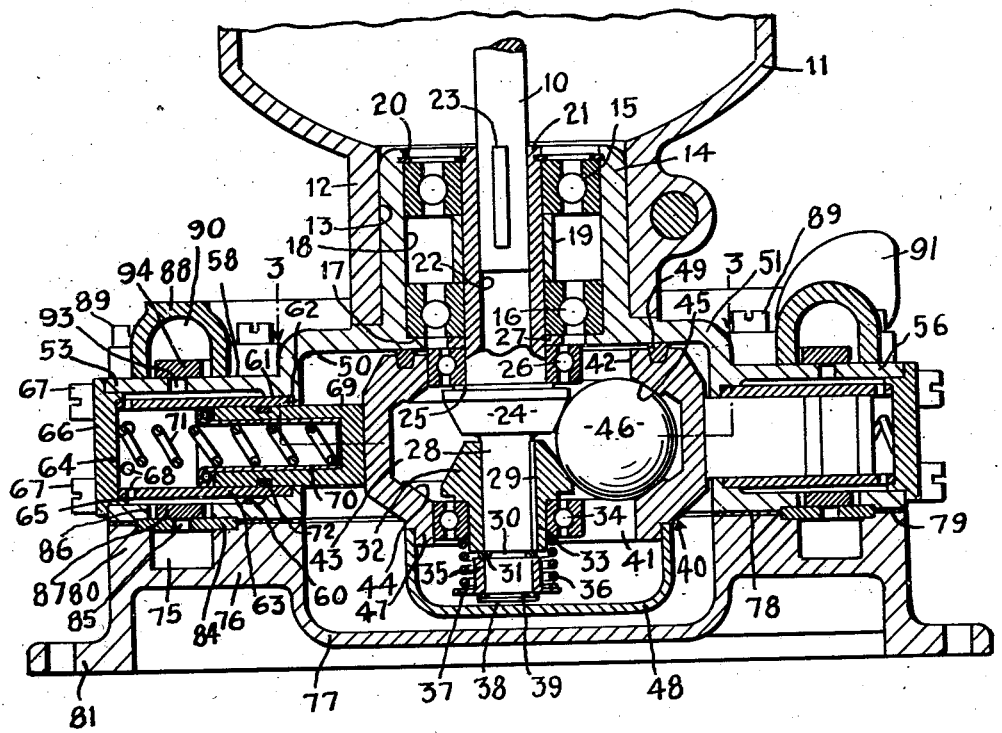
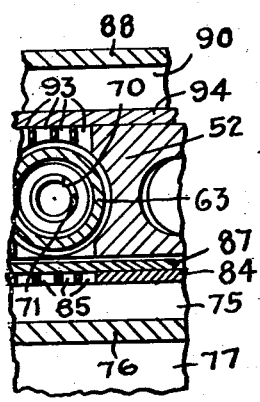
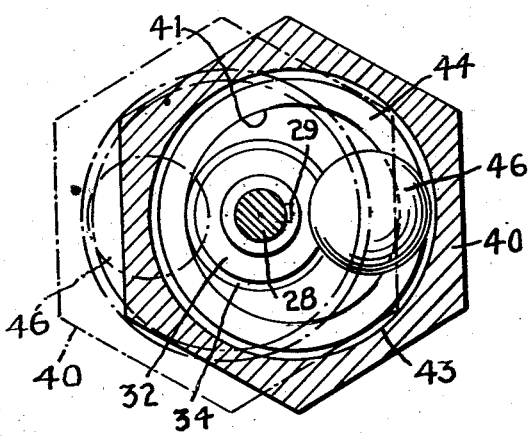
INVENTOR
LINDSAY H. BROWNE
BY
ATTORNEYS Patented Sept. 9, 1947

2,427,253

UNITED STATES PATENT OFFICE 2,427,253

EPICYCLIC DRIVE

Lindsay H. Browne, Westport, Conn., assignor to American Brake Shoe Company, a corporation of Delaware Application September 21, 1943, Serial No. 503,241

18 Claims. (Cl. 74—302)

1

This invention relates to improvements in epicyclic drives, and has for a main object the provision of an epicyclic drive which can be directly connected to a prime mover and adapted to transform the rotary motion of the prime mover into reciprocative motion at reduced speed.

A further object of the invention is the provision in an epicyclic drive of a hollow housing having an inwardly facing outer race formed therein, a shaft at right angles to the plane of said race, an outwardly facing inner race carried on said shaft in alignment with said outer race, a ball between and adapted to roll around said races as said shaft is rotated, thereby causing said housing to reciprocate at a speed substantially less than the speed of rotation of said shaft.

Another object of the invention is the provision of an epicyclic drive, of which a reciprocative member has formed therein an outer race around which a ball travels, and in which the inner race includes a conical rotative member, the conical surface of which is fixed with respect to the radial axis of said race, and a second conical member facing, keyed to, and movable toward said first conical member under the urge of spring means acting axially thereof, so as to effect initial intimate engagement of said ball with said race and said conical surfaces. As the inner conical members are rotated, the ball rolls around the outer race and reciprocates the same at a speed substantially less than the speed of the rotating conical members, depending on the diameter of the ball, and the effective diameters of said races.

A further object of the invention is the provision in an epicyclic drive of a hollow housing having an inwardly facing outer race formed therein and a pair of axially aligned spaced bores at right angles to the plane of said race, a shaft having its axis parallel to the axis of said bores, an outwardly facing inner race carried on said shaft in alignment with said outer race, a ball between and adapted to roll around said races as said shaft is rotated, a pair of spaced inseparable ball bearings on said shaft cooperating with said bores, the outer diameters of said ball bearings being in line-contact with the surfaces of said bores and adapted to roll around said surfaces as said ball rolls around said inwardly facing outer race, said ball bearings and said inner race acting conjointly to maintain said ball in contact with said outer race, thereby causing said housing to reciprocate at a speed substantially less than the speed of rotation of said shaft when the latter is rotated.

2

Yet another object of the invention is the provision of an epicyclic drive including a conical member, a race thereabout, a single ball in said race, an inner race, means for driving the latter, and one or more positionable members in contact with and reciprocated by said outer race.

Other objects and advantages of the invention will be apparent to those skilled in the art upon a study of the following specification and the accompanying drawings.

For the purpose of illustrating the invention, my new and improved epicyclic drive is shown as interposed between an electric motor and one or more cylinders of a pump, but it must be understood that the invention is not limited to a pump per se.

Figure 2 is a sectional elevation as viewed along the line 2—2 of Figure 1;

Figure 3 is a view partly in section taken along the line 3—3 of Figure 2;

Figure 6 is a sectional elevation taken along the lines 6—6 of Figure 1.

Figure 1:
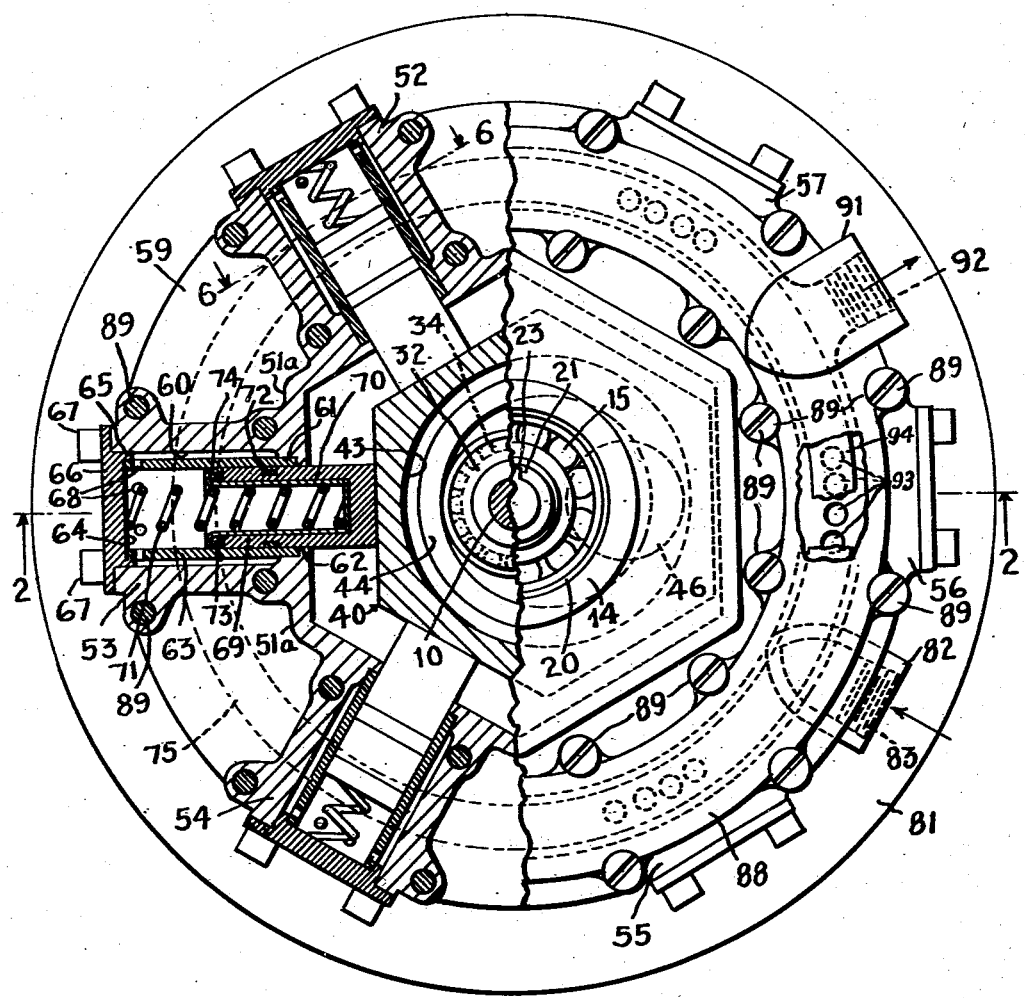
Figure 1 is a plan view of an embodiment of my epicyclic drive shown as utilized for reciprocally driving a pump.

My new and improved epicyclic drive may be connected to any prime mover or rotating shaft. However, for the purposes of illustrating the invention it is shown as directly connected to the shaft 10 of an electric motor 11. The end 12 of the motor housing may be bored out at 13 to accommodate a boss 14 carrying ball bearings 15 and 16. The lower end of the ball bearing 16 rests against a shoulder 17 in the bore 18. Between the ball bearing 16 and ball bearing 15 is a spacer sleeve 19, and the bearings are secured in the bore 18 by means of a suitable locking ring 20.

A stub shaft 21 has a central hole 22 therein forming a fit with the motor shaft 10. A key way therein (not shown) engages a key 23 in the motor shaft 10.

Preferably formed integral with the stub shaft 21 is a conical portion 24 the upper end of which is in the form of a shoulder 25. A ball bearing 26 carried on the stub shaft 21 contacts the shoulder 25, and a washer 27 is positioned on the stub shaft 21 between the ball bearing 26 and the ball bearing 16.

The stub shaft 21 has a portion 28 of reduced diameter which carries a key 29. The portion 28 has a groove 30 formed therein, and a spring ring 31 is positioned in this groove. A conical member 32 is carried on the shaft 28 and has a key way engaged by the key 29. This conical member forms a working fit on the shaft, has its conical face facing the conical portion 24 and these two conical faces perform a unique function which will hereinafter be described. The conical member 32 has a shank portion 33 which has fitted thereto the inner race of a ball bearing 34. A flanged bushing 35 is positioned on the lower end of shaft 28 and is surrounded by a helical spring 36 the lower end of which engages the flange 37 and the upper end of which engages the inner race of the ball bearing 34. A screw 38 threaded into the end of shaft 28, and a washer 39, serve to retain the sleeve 35 on the shaft 28. The spring 36 serves to urge the conical member 32 upwardly as will hereinafter be described.

A hollow member 40 has a bore 41 in one end thereof and a second bore 42 in the other end, preferably in alignment with the bore 41, and these bores are provided for accommodating the ball bearings 26 and 34. An annular chamber 43 is formed in the hollow member 40, and between the annular chamber 43 and the bore 41 is formed a conical surface 44. Likewise between the annular chamber 43 and the bore 42 is formed a conical surface 45.

A steel ball 46 is positioned within the hollow member 40 and engages the conical surfaces 44 and 45. The opposite side of the ball 46 is engaged by the conical surfaces 24 and 32. The diameter of the ball 46 is such that the outer races of the ball bearings 26 and 34, respectively, form line-contacts with the bores 42 and 41. The clearance between the lower end of the shank portion 33 (of the lower conical member 32) and the spring ring 31, when the ball is positioned between the conical surfaces or races, is just a few thousandths of an inch. The urge of the spring 36 maintains the conical surface 32 in initial contact with the ball 46 with the result that all the rest of the conical surfaces are maintained in contact with the ball.

I am of the opinion that were it not so difficult to get duplicate parts having absolutely the same dimensions, the spring-flange arrangement 35, 36 could be eliminated. However, I employ the spring 36 to take care of the dimensional differences encountered in ordinary manufacture.

The hollow member 40 has a boss 47 formed on its lower end and a cup 48 is pressed onto this boss. The interior of the hollow member 40 and the interior of the cup 48 may be packed with a suitable grease or lubricant. The upper end of the hollow member 40 has a groove formed therein, in which a felt ring 49 may be fitted. This felt ring members up with the surface 50 of a casing 51 formed integral with the boss 14.

Before describing mechanism associated with my new and improved epicyclic drive for doing useful work, it is believed that a brief explanation of the drive per se is in order.

As the motor shaft 19 rotates, the stub shaft 21 carrying the conical surfaces 24 and 32 is rotated in time therewith. The ball bearings 26 and 34, as has been explained, form line-contacts with the bores 42 and 41, respectively. Therefore, the inner races of these two ball bearings, one of which is carried on the stub shaft 21 and the other of which is carried on the shank of the conical member 32, rotate. The ball 46 has been described as in contact with the conical surfaces 24 and 32 and in contact with the conical surfaces 44 and 45 in the hollow member 40, and the conical surfaces 44 and 45 might be considered collectively as an outer race.

Now, due to the rotation of the conical surfaces 24 and 32 (which might also be considered collectively as an inner race), the ball 46 is in turn rotated and this ball rolls around the outer race (conical surfaces 44 and 45) and, since there is only sufficient space for the ball between the inner and outer races at one point, the ball must attempt to interpose itself between spaces not then sufficiently large to contain it. Therefore, as the ball rolls, the hollow member 40 moves with respect to the axis of the inner race continuously and thereby provides the necessary space to contain the ball. In this manner the ball rolls around and around between the races, and the hollow member 40 oscillates with respect to the axis of the inner race.

As the hollow member 40 oscillates, the outer races of the ball bearings 26 and 34 roll around the surfaces of the bores 42 and 41, respectively.

Due to the fact that the diameters of the inner race in contact with the ball are smaller than the contact diameters of the outer race with the ball, the rotary motion of the motor, or any other prime mover connected to the stub shaft 21, is not only changed into oscillatory movement but the speed is reduced proportionate to the ratio of said diameters. The result is that I am able to produce, with my new and improved epicyclic drive, the reduction and transformation of high speed rotary motion into reciprocating motion at a lower speed.

Now to show one way of obtaining useful work from my new and improved epicyclic drive, the casing 51 (which might correspond to the crank case on conventional type pumps) may be provided with a plurality of radial bosses referred to by the numerals 52, 53, 54, 55, 56, 57. These bosses are each provided with stepped bores which will presently be described in detail. Joining the upper surfaces of these bosses is a web 58, and a similar web 59 joins the bottoms of all said bosses thus, the casing 51, the bosses 52, 53, 54, 55, 56, 57, and the webs 58 and 59, may be embodied in a single casting. The construction of each of the six pumping elements is identical, therefore, from a description of the boss 53 a perfect understanding of the entire construction will be evident.

The radial boss 53 has a cast hole 60 formed therein for a depth extending from the outer (or left) end, as viewed in Figure 1, to approximately the level 51a—51a of the casing 59. This hole has a counter-bored extension 61 and the second counter-bored extension 62.

A tubular member 63 has its inner end forming a fit with the counter-bored extension 61 and has its outer end retained in a counter-bored hole 64 formed in a boss 65 on the cylinder head 66. The cylinder head is secured to the boss 53 by means of the screws 67, and the boss 65 fits the hole 60. A series of holes 68 are formed in the tubular member 63 adjacent to the boss 65 on the cylinder head and these holes permit fluid mediums to enter and leave the interior of the tubular member 63. The tubular member 63 is in fact a cylinder into which is fitted a hollow piston 69, the hollow interior of which carries a cup-shaped member 70.

A helical spring 71 has one end bottoming in the cup 70 and has its other end contacting the cylinder head 66. Therefore the piston 69 is always urged into contact with the hollow member 40. The piston 69 is provided with a suitable sealing ring 72 between the ends thereof and a second sealing arrangement at the inner end thereof formed between the flanged lip of the cup 70, an elastic sealing ring 73 and an annular washer 74 of L cross-section. The counter-bored extension 62 above described forms a clearance for the piston.

Above I have described a series of holes 68 for permitting fluids to enter and leave the cylinder 63. Referring now to Figure 2, an annular groove 75 is formed in a radial web 76, which forms an extension of the casing closure 77. The casing closure 77 has a hollow interior which matches the hollow interior of the casing 51, and a gasket 78 forms a seal therebetween on one side of the groove 75 and a second gasket 79 seals the groove 75 off from the atmosphere.

The web 76 terminates in a rim 80 which has an annular flange 81 formed integral therewith and this annular flange forms a base for the pump.

An inlet boss 82 formed in the rim portion 80 is hollow and is provided with threads 83 for connection to a pipe or fitting. The interior of the boss 82 communicates with the annular groove 75.

An annular ring 84 in sealed relation to the radial web 76 and also in sealed relation to the lower faces of the cylinder bosses, is provided with a plurality of series of holes (one series for each cylinder). One hole 85 of the series associated with the lower face of the boss 53 is shown in Figure 2.

An annular groove 86 is formed in the web 59 and the boss 53 adjacent to the series of holes 85 above described. In fact, the annular groove 86 spans all of the other radial bosses in the same manner and communicates with the holes thereof corresponding to the hole 69 shown in the radial boss 53. A valve ring 87 is provided for normally sealing off the various sets of holes 85. This ring may be made of any suitable material. I find that excellent results are obtained with valve rings constructed of natural or artificial rubber compounds. As stated above, the valve ring normally contacts the ring 84 and closes off the various sets of holes 85. Since the valve ring is flexible, the portion covering holes 85 on any cylinder on the intake stroke is raised up or unseated by the fluid flowing from the annular ring 75 via the holes 85 and the holes 68 and into the cylinder without disturbing the sealing relation of the valve ring with other cylinders which are not on an intake stroke.

Having described the intake stroke of the piston 69 and the action of the inlet valve 85, 87, the action of the discharge will now be described.

The upper surface of the web 53 is flat and a discharge manifold 88 is secured in fluid-tight relation to this surface by means of screws 89. The manifold has a hollow interior 90 which is annular in form, and a boss 91 formed integral with the manifold 88 has an opening 92 therein in communication with said hollow interior. Formed in the web 59 directly above the several bosses carrying the cylinders 63 are several series of holes 93 (one series for each cylinder). These holes provide communication between the hollow interior 90 of the manifold and the space between the bore 60 and the outer wall of the cylinder sleeve 63.

An annular valve ring 94 (which may be identical with the valve ring 87) normally overlies all of said series of these holes 93.

Assuming that the cylinder 63, which has its piston 69 at the extreme end of its suction stroke, now starts back (to the left) on its compression stroke, liquid in the cylinder passes out through the holes 68 into the space between the bore 60 and the exterior of the cylinder sleeve 63 and thence via the holes 93 into the hollow interior 90 of the manifold 88. The pressure of the fluid in the manifold 88 tends to hold the valve ring 94 in intimate contact with the several series of holes 93 formed in the web 88, but due to the fact that the fluid pressure is rising in the cylinder 63 as the piston moves to the left, the fluid being discharged raises the valve ring 94 off of the holes 93 associated with the cylinder on the discharge stroke, and the relationship of the valve ring to the holes 93 associated with the other cylinders is undisturbed.

As stated above, the other five cylinders perform in the same manner, and all of the pistons are reciprocated by the hollow member 40.

Due to the fact that the hollow member 40 does not have any substantial rotative urge and merely reciprocates, sliding motion is effected between the ends of the pistons in contact with the hollow member 40 and the six flat sides of the hollow member itself.

Figure 4:
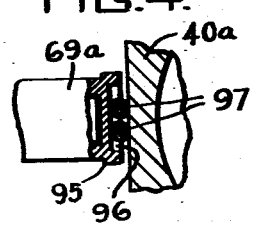
Figure 4 is a fragmentary view showing a modification wherein rollers are provided between the reciprocative member and the pistons.
Figure 5:
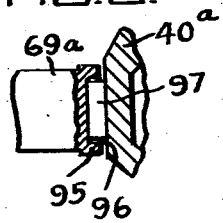
Figure 5 is a fragmentary view similar to Figure 4 but taken along the line 90 degrees thereto.

In order to reduce the friction between the pistons and the hollow member (which friction is by no means serious) a modification is shown in Figures 4 and 5 wherein the piston 69ᵃ is enlarged on its outer end to form a boss 95. A rectangular hole 96 may be formed in this boss, and positioned within this rectangular hole 96 are rollers 97. As the hollow member 40ᵃ reciprocates, the rollers 97, which are in contact with the flat surfaces of the hollow member, are rolled back and forth within the rectangular hole 96 and thereby the friction encountered between the end of the piston and the hollow member 40 is substantially reduced.

Although I have herein shown and described my new and improved epicyclic drive and its application to a pump to give an example of one way of utilizing the drive, it is obvious that many changes may be made in the arrangement herein shown and described, and/or in the devices driven thereby, without departing from the spirit of the invention as set forth in the following claims.

What is claimed is:

1. In an epicyclic drive, a driven member having an inwardly facing outer race formed therein, a shaft forming a driving member, an outwardly facing inner race carried on said shaft, said shaft having its axis at right angles to the plane of said outer race, a single roller member between said races, and means spaced apart from said races and said roller member and cooperating with said driven member for maintaining said races and said roller member in rolling contact, thereby causing said driven member to move on an orbital path.

2. In an epicyclic drive, a hollow housing having an inwardly facing race formed therein and an annular surface concentric therewith and spaced axially therefrom, said housing constituting a driven member, a shaft parallel to the axis of said race, an outwardly facing race carried on said shaft in alignment with said first race, a single roller element in contact with and adapted to roll around said races as said shaft is rotated, and means carried on said shaft and adapted to cooperate with said annular surface for maintaining said roller element in contact with said races as aforesaid, whereby said housing is reciprocated when said shaft is rotated.

3. In an epicyclic drive, a hollow member having a polygonal exterior for engaging a device to be driven and having an inwardly facing race formed therein and an inwardly facing bore concentric therewith and axially spaced apart therefrom, a shaft having its axis parallel to and spaced apart from the axis of said race, an inner race carried on said shaft in alignment with said first race, a single ball between said races, and a member carried on said shaft in contact with said bore and adapted to roll around the surface thereof and thereby maintain said ball in rolling contact with said races, said outer race being adapted to move on an orbital path as said shaft is rotated.

4. In an epicyclic drive, a ring member carrying an inwardly facing outer race and at least one axial bore concentric with said race, said ring member constituting a driven member, a shaft constituting a driving member and having its axis parallel to and spaced apart from the axis of said race, an inner race fixed on said shaft and lying in a plane coincident with the plane of said outer race, a single ball between said races, and roller means carried on said shaft and in rolling contact with said bore for maintaining said ball in contact with said races, whereby said ball advances and continuously interposes itself between said races as said shaft is rotated, thereby causing said driven member to reciprocate at a speed slower than the speed of rotation of said driving member.

5. In an epicyclic drive, a hollow housing having an inwardly facing race formed therein, a pair of bores formed in said housing, said bores being concentric with and spaced apart from said race, a shaft having its axis parallel to the axis of said race, an inner race keyed on said shaft in alignment with said first race, a single roller element in contact with both said races, a pair of frictionless bearings mounted on said shaft in contact with the surfaces of said bores and adapted to maintain said roller element in contact with said races as aforesaid as they roll around said surfaces by causing said housing to reciprocate.

6. In an epicyclic drive, a hollow housing having an inwardly facing race formed therein, a shaft having its axis parallel to the axis of said race and carrying a frustro-conical portion, a second frustro-conical member keyed to said shaft, with its small end facing the small end of said first frustro-conical portion and together forming an inner race, a single free member in contact with and adapted to roll around said races, means urging said frustro-conical member toward said portion and thereby maintaining said member in contact with said races, and means axially spaced apart from said races and partly on said housing and partly on said shaft for maintaining a predetermined relation between said races, whereby said housing is reciprocated at a lower speed than the speed said shaft is rotated.

7. In an epicyclic drive, a reciprocative member having an interior annular bore, an angular face formed therein, to one side of said bore, and a second angular face to the other side of said bore, said angular faces forming an outer race; a hole formed in said member adjacent to and in axial alignment with one of said faces and a second hole formed therein in axial alignment with said first hole and adjacent to said second face, a shaft having its axis parallel to the axes of said holes, an inner race carried on said shaft and formed in part of a member fixed on said shaft and carrying an angular face and in part of a second member keyed to and movable axially on said shaft, said second member also having an angular face facing said first face, spring means for urging said second member toward said first member, a single ball between and in rolling contact with both said races, and bearing means carried on said shaft in cooperative relation with the surfaces of said holes for maintaining said ball in rolling contact with said races as aforesaid.

8. In an epicyclic drive, a hollow housing having an inwardly facing outer race formed therein, a pair of spaced bores formed in said housing, said bores having their axes in alignment with each other and concentric with the axis of said outer race, a shaft having its axis parallel to said axis, an inner race carried on and keyed to said shaft in alignment with said outer race, said inner race being formed of two frustro-conical portions having their small ends adjacent, a single ball positioned between and in contact with said races, and a pair of frictionless bearing mounted on said shaft, one of said bearings being adapted to roll around the surface of one of said bores and the other of said bearings being adapted to roll around the surface of the other of said bores, and conjointly adapted to effect continuous engagement of said ball with said races.

9. The invention according to claim 8, in which one of said frustro-conical portions is movable axially on said shaft, and in which spring means is provided for urging said last mentioned frustro-conical portion toward the other, thereby initially maintaining contact between said races and said ball and eliminating the necessity of maintaining limits too close to be practical in the manufacture of said drive.

10. In an epicyclic drive, a hollow housing having an inwardly facing race formed therein, aligned holes formed in said housing, said aligned holes being concentric with each other and having their axes coinciding with the axis of said race, a shaft having its axis parallel to the axes of said holes, a member carrying an inner race and mounted on said shaft with its race coplanar with said first race, a rolling member in contact with and adapted to roll around said races as said shaft is rotated, and means carried on said shaft and adapted to roll around the surfaces of said aligned holes for maintaining said rolling member in contact with said races, the points of contact between said last means and the surfaces of said holes and the points of contact between said rolling member and said races being disposed on opposite sides of the center of said shaft.

11. An epicyclic drive according to claim 10 in which cup means secured to the bottom of said housing forms a fluid tight closure for retaining lubricant in said housing, and in which a ring of felt or the like is mounted in the upper end of said housing, and in which a bearing boss for said shaft has a flat annular surface above said housing and contacted by said ring.

12. In an apparatus for converting rotary to reciprocatory motion, a shaft forming a driving member and having an outwardly facing race, a driven member having an inwardly facing race, a single roller element engaging both said races, said element being rotated by said outwardly facing race and imparting motion to said inwardly facing race, and means on said shaft cooperating with said driven member for maintaining said roller element incontinuous engagement with both said races during rotation of said shaft.

13. In an apparatus for converting rotary to reciprocatory motion, a shaft forming a driving member, said shaft having an outwardly facing race, a housing forming a driven member and having an inwardly facing race, said housing also having axially aligned annular surfaces the axes of which are disposed at right angles to the plane of said inwardly facing race, a single roller element engaging said races and rotated by said outwardly facing race, and bearing means interposed between said shaft and said annular surfaces for maintaining said roller element in continuous engagement with both said races during rotation of said shaft.

14. In an apparatus for converting rotary to reciprocatory motion, a shaft forming a driving member, said shaft having an outwardly facing race, a driven member having an inwardly facing race, a single roller element engaging said races for receiving rotation from said outwardly facing race and imparting motion to said inwardly facing race, and means laterally displaced from the path of said roller element and interposed between said shaft and said driven member for maintaining said roller element in continuous engagement with both said races during rotation of said shaft.

15. In an apparatus for converting rotary to reciprocatory motion, a shaft forming a driving member, said shaft having an outwardly facing annular race, a driven member having an inwardly facing annular race, the respective longitudinal axes of said races being displaced with respect to each other, a single roller element engaging said races for receiving rotation from said outwardly facing race and imparting motion to said inwardly facing race, and means interposed between said shaft and said driven member for maintaining said roller element in continuous engagement with both said races during rotation of said shaft.

16. In an apparatus for converting rotary to reciprocatory motion, a shaft forming a driving member, said shaft having an outwardly facing annular race, a driven member having an inwardly facing annular race eccentrically disposed with respect to said outwardly facing race, a single roller element engaging said races for receiving rotation from said outwardly facing race and imparting motion to said inwardly facing race, said driven member having another annular surface, and bearing means interposed between said shaft and the last mentioned annular surface.

17. A mechanical movement including a rotary driving member having an engageable annular surface, a driven member having at least a portion of its interior surface annular and eccentric with respect to said engageable surface, a roller member positioned between and in contact with both said surfaces at the points of greatest eccentricity, and means between said driving and driven members and axially spaced apart from said roller member for maintaining said member in rolling engagement with said surface.

18. In an apparatus for converting rotary motion to reciprocatory motion of an element, a rotatable shaft forming a driving member, said shaft having an outwardly facing annular race, a driven member adapted for imparting motion to said element, said driven member having an inwardly facing annular race eccentrically disposed with respect to said outwardly facing race, a single roller element between said races, and means cooperating with both said members for maintaining said roller element in rolling engagement with both said races, whereby said roller element may concurrently receive motion from said first race and impart motion to said second race.

LINDSAY H. BROWNE.

REFERENCES CITED

The following references are of record in the file of this patent:

UNITED STATES PATENTS

| Number | Name | Date |
| --- | --- | --- |
| 1,634,507 | Morison | July 5, 1927 |
| 1,735,616 | Morison | Nov. 12, 1929 |
| 1,920,123 | Ernst | July 25, 1933 |
| 605,845 | Belanger | June 21, 1898 |
| 885,354 | Loquin | Apr. 21, 1908 |
| 1,786,595 | Bischof | Dec. 30, 1930 |
| 1,979,863 | Carruthers | Nov. 6, 1934 |
| 2,219,002 | Beeh | Oct. 22, 1940 |
| 2,307,374 | Johnston | Jan. 5, 1943 |
| 2,313,284 | Valentine | Mar. 9, 1943 |

FOREIGN PATENTS

| Number | Country | Date |
| --- | --- | --- |
| 207,035 | Great Britain | Nov. 22, 1923 |
| 316,328 | Germany | Nov. 25, 1919 |
| 311,744 | Great Britain | May 8, 1930 |